Figure 1:
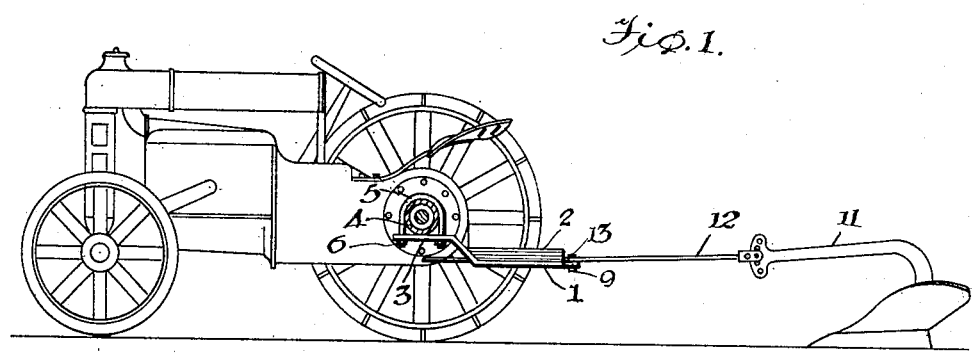

W. J. BERNARD.
TRACTOR PLATFORM.
APPLICATION FILED JULY 30, 1920.

1,394,883.

Patented Oct. 25, 1921.

WITNESSES

INVENTOR
Willy J. Bernard,
BY
ATTORNEYS

UNITED STATES PATENT OFFICE.

WILLY JOHN BERNARD, OF NEW IBERIA, LOUISIANA, ASSIGNOR TO A. M. BERNARD WAGON WORKS, OF NEW IBERIA, LOUISIANA, A CORPORATION OF LOUISIANA.

TRACTOR-PLATFORM.

1,394,883.  Specification of Letters Patent.  Patented Oct. 25, 1921.

Application filed July 30, 1920. Serial No. 400,144.

*To all whom it may concern:*

Be it known that I, WILLY JOHN BERNARD, a citizen of the United States, and a resident of New Iberia, in the parish of Iberia and State of Louisiana, have invented certain new and useful Improvements in Tractor-Platforms, of which the following is a specification.

My invention is an improvement in tractor platforms, and has for its object to provide a device of the character specified, adapted for connection with the Fordson type of tractors, for providing a supporting platform on which the operator may stand when he desires, the said platform forming also a connection between the article being drawn and the tractor.

Figure 2:
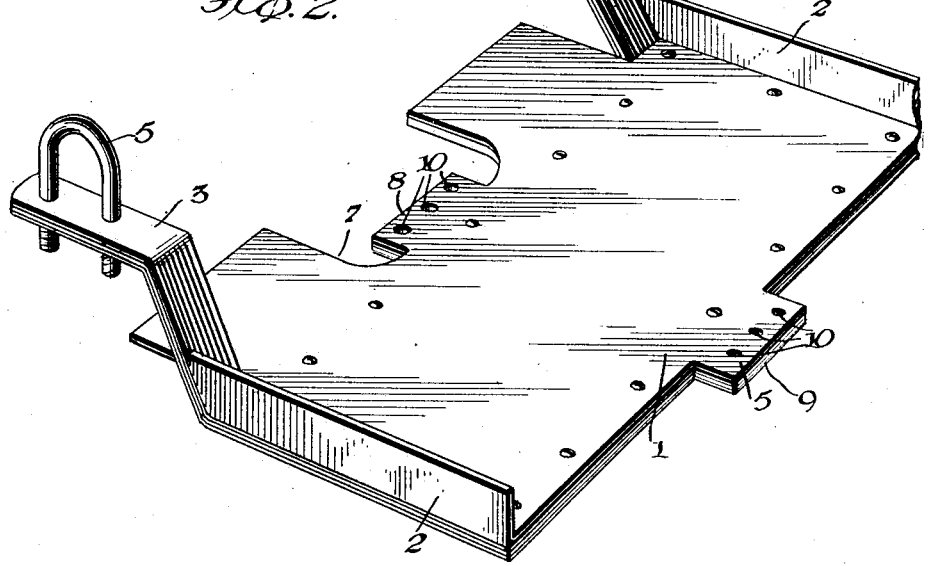

In the drawings:

Figure 1 is a side view with the rear axle in section of a Fordson tractor having the improved platform, Fig. 2 is a perspective view of the platform detached.

In the present embodiment of the invention, the improved platform comprises a plate 1 of sheet metal, having at each side edge an upstanding flange 2 which provides a guard for preventing accidental displacement of the driver's feet. At the front end of the plate and near each end, a portion of the material of the plate is separated therefrom and offset upwardly as shown at 3 to provide a hitch for connecting the platform with the rear axle housing 4 of the tractor. U-shaped clips 5 have their arms passed through openings in these upwardly offset portions, and the clips are adapted to be engaged by nuts 6 below the upwardly offset portion, the clips embracing the axle housing of the tractor as clearly shown in Fig. 1.

The plate 1 has extensions at its forward edge and at the ends, and these extensions form a part of the upwardly offset portions 3. That is, the aggregate length of the upwardly offset portion and its connection with the body of the plate is greater than the distance from the attachment of the said connection with the body of the plate to the front edge of the plate.

The plate is recessed at the center of its front edge, as shown at 7, and a forwardly extending tongue 8 is provided at the bottom of the recess which is bolted to the tractor hitch. A smaller tongue 9 is provided at the rear edge of the plate, in register with the tongue 8, and these tongues 8 and 9 have series of openings 10 as shown.

By means of the tongue 9 the platform may be connected with the beam of the plow 11, by means of a draw bar 12 which is connected to the beam of the plow at one end and to the tongue 9 at the other, the latter connection being by means of a bolt and nut 13, which passes through one of the series of openings 10. The forwardly extending tongue 8 may be connected with the draw bar connection of the tractor.

In use, the operator, when tired of riding, may stand on the platform. The guards 2 prevent his feet slipping, and he may easily leave the platform in case of overturn or the like.

I claim:

1. A device of the character specified, comprising a plate having its side edges upturned to form guards, said plate having at opposite ends of its front edge an upwardly and forwardly offset extension provided with attaching clips for connecting said extensions to the rear axle housing of a tractor, said plate having intermediate the ends of its rear edge a tongue for connection with the draw bar of the article to be drawn, and having its front edge centrally recessed and provided with a hitching tongue at the center of the recess for connection with the draw bar of the tractor.

2. A device of the character specified, comprising a plate having its side edges upturned to form guards, said plate having at each end of its front edge an upwardly and forwardly offset extension provided with attaching clips for connecting said extensions to the rear axle housing of a tractor, said plate having intermediate the ends of its rear edge a tongue for connection with the draw bar of the article to be drawn, each of the clips comprising a substantially U-shaped member for embracing the housing, the extensions having openings through which the arms of the clips extend.

WILLY JOHN BERNARD.